US010830066B2

United States Patent
Cuvillier et al.

(10) Patent No.: US 10,830,066 B2
(45) Date of Patent: Nov. 10, 2020

(54) LOW-PITCH VARIABLE-SETTING FAN OF A TURBINE ENGINE

(71) Applicant: Safran Aircraft Engines, Paris (FR)

(72) Inventors: Romain Guillaume Cuvillier, Moissy-Cramayel (FR); Nils Edouard Romain Bordoni, Moissy-Cramayel (FR); Michel Gilbert Roland Brault, Moissy-Cramayel (FR); Guillaume Patrice Kubiak, Moissy-Cramayel (FR); Arnaud Nicolas Negri, Moissy-Cramayel (FR); Nathalie Nowakowski, Moissy-Cramayel (FR); Emmanuel Pierre Dimitri Patsouris, Moissy-Cramayel (FR); Sebastien Emile Philippe Tajan, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 252 days.

(21) Appl. No.: 16/068,029

(22) PCT Filed: Jan. 5, 2017

(86) PCT No.: PCT/FR2017/050030
§ 371 (c)(1),
(2) Date: Jul. 3, 2018

(87) PCT Pub. No.: WO2017/118820
PCT Pub. Date: Jul. 13, 2017

(65) Prior Publication Data
US 2020/0095876 A1    Mar. 26, 2020

(30) Foreign Application Priority Data

Jan. 5, 2016  (FR) ..................................... 16 50024
Jan. 5, 2016  (FR) ..................................... 16 50041

(51) Int. Cl.
| | |
|---|---|
| F01D 7/00 | (2006.01) |
| F02K 3/06 | (2006.01) |
| F04D 29/36 | (2006.01) |

(52) U.S. Cl.
CPC .................. F01D 7/00 (2013.01); F02K 3/06 (2013.01); F04D 29/362 (2013.01);
(Continued)

(58) Field of Classification Search
CPC ... F01D 7/00; F01D 7/02; F04D 29/36; F04D 29/362; F04D 29/364; F04D 29/366;
(Continued)

(56) References Cited

U.S. PATENT DOCUMENTS 1,890,932 A * 12/1932 Briner ..................... B64C 11/36
                                                  416/166
2,152,419 A *  3/1939 Platt ........................ B64C 11/34
                                                  416/40
(Continued)

FOREIGN PATENT DOCUMENTS

DE         849 052 C      9/1952
EP    2 009 246 A2      12/2008
(Continued)

OTHER PUBLICATIONS

English Translation of International Search Opinion for corresponding case PCT/FR2017/050030, dated Mar. 31, 2017 (Year: 2017).*
(Continued)

*Primary Examiner* — Eldon T Brockman
*Assistant Examiner* — Topaz L. Elliott
(74) *Attorney, Agent, or Firm* — Oblon, McClelland, Maier & Neustadt, L.L.P.

(57) ABSTRACT

A fan of a turbine engine includes a disc provided with blades at the periphery thereof, the blades being mounted so as to pivot on the disc about a pivot axis, and a mechanism
(Continued)

for changing the pitch of the blades. The mechanism is configured to adjust an angular position of each blade around the pivot axis. The angular position is in an angular setting range no greater than 20°.

20 Claims, 3 Drawing Sheets

(52) U.S. Cl.
CPC ...... *F05D 2220/36* (2013.01); *F05D 2260/74* (2013.01); *F05D 2260/79* (2013.01)

(58) Field of Classification Search
CPC .......... F04D 29/368; F02C 9/58; B64C 11/06; B64C 11/30–44; F05D 2260/70–79
See application file for complete search history.

(56) References Cited

U.S. PATENT DOCUMENTS

| | | | | |
|---|---|---|---|---|
| 2,275,361 | A * | 3/1942 | Godfrey | B64C 11/343 416/51 |
| 2,492,653 | A * | 12/1949 | Reek | B64C 11/343 416/89 |
| 3,143,175 | A * | 8/1964 | Elmes | B64C 11/385 416/154 |
| 3,163,231 | A * | 12/1964 | Barnes | B64C 11/308 416/33 |
| 5,478,203 | A * | 12/1995 | Barker | F01D 7/02 415/147 |
| 5,595,474 | A * | 1/1997 | Girard | B64C 11/44 416/1 |
| 7,503,750 | B1 * | 3/2009 | Violette | B64C 11/06 416/134 A |
| 8,262,352 | B2 * | 9/2012 | Gainford | B64C 11/44 416/1 |
| 8,596,975 | B2 * | 12/2013 | Gallet | F01D 7/00 416/147 |
| 9,194,397 | B2 * | 11/2015 | Todorovic | F01D 5/3007 |
| 9,932,120 | B2 * | 4/2018 | Fisher | B64C 11/305 |
| 10,253,784 | B2 * | 4/2019 | Fulayter | B64C 11/325 |
| 2009/0004008 | A1 | 1/2009 | Richards | |
| 2012/0055137 | A1 | 3/2012 | Bouiller et al. | |
| 2013/0224021 | A1 | 8/2013 | Gallet et al. | |
| 2013/0287575 | A1 * | 10/2013 | McCune | F04D 29/325 416/170 R |
| 2015/0125259 | A1 * | 5/2015 | Suciu | F02C 7/36 415/1 |
| 2015/0285262 | A1 | 10/2015 | Fabre et al. | |
| 2016/0146025 | A1 * | 5/2016 | Miller | F01D 9/041 60/805 |
| 2016/0229547 | A1 * | 8/2016 | Fisher | B64C 11/303 |
| 2016/0265547 | A1 * | 9/2016 | Fulayter | B64C 11/325 |
| 2016/0290228 | A1 * | 10/2016 | van der Merwe | F04D 29/059 |
| 2016/0363047 | A1 * | 12/2016 | Schwarz | F02C 3/107 |
| 2017/0122119 | A1 * | 5/2017 | Niergarth | F01D 5/12 |
| 2017/0138370 | A1 * | 5/2017 | Miller | F04D 29/323 |
| 2017/0191495 | A1 * | 7/2017 | Bordoni | F04D 19/002 |

FOREIGN PATENT DOCUMENTS

| | | | | |
|---|---|---|---|---|
| GB | | 810453 A * | 3/1959 | ............ B64C 11/42 |
| WO | WO 2010/097438 A2 | | 9/2010 | |
| WO | WO 2012/066240 A1 | | 5/2012 | |
| WO | WO 2014/060681 A1 | | 4/2014 | |

OTHER PUBLICATIONS

International Search Report dated Mar. 31, 2017, in PCT/FR2017/050030, filed Jan. 5, 2017.

Search Report dated Sep. 8, 2016 in French Patent Application No. 1650024 (with English translation of categories of cited documents), 8 pages.

* cited by examiner

LOW-PITCH VARIABLE-SETTING FAN OF A TURBINE ENGINE

FIELD OF THE INVENTION

The invention relates to the field of turbomachines comprising a propeller or a variable-setting fan.

TECHNOLOGICAL BACKGROUND

Different architectures of turbine engines have recourse to a propeller (turboprop, open rotor) or a variable-setting fan. This variability allows the turbine engine to adapt itself to flight conditions by maintaining a favorable angle of attack of the air on the blades. The variability of the setting is particularly necessary for rotors having a low pressure ratio, such as the propellers of turboprops and the fans of turbine engines having a high bypass ratio (ratio between the flow rate of the secondary (cold) flow and the flow rate of the primary flow (which passes through the primary body)).

Multiple devices have been imagined to vary the setting of the blades. These devices generally include rotation of the blade around its main axis by means of conical gears, situated below the root of the blade. The latter cooperate with conical gears of a control system configured to control the setting of the blade.

In normal use, during flight phases, the possible interval for the setting of a blade is generally approximately 65° (+40°, −25° with respect to the angular position of the blade in the cruise phase), between a low pitch position at low advance speed and a high pitch position at high speed. The settings in these normal conditions of use are, by convention, called positive.

Shown in FIG. 3 is a section view of an example of a rotor blade (of a fan or a turboprop propeller) on which has been illustrated the center of gravity G of the blade. It will be understood that, in the event of a failure, the blade has a tendency to turn on itself around the pivoting axis Y (following the arrow A) under the influence of centrifugal forces Fc which are applied to it. The blade is then found to be in a position called "flat pitch" in which the blades form an angle of approximately 0° with the plane of rotation of the blades (that is the plane comprising the pivoting axes of the blades of the rotor, which is perpendicular to the axis of rotation of the rotor), which is very unfavorable for the drag of the airplane. In fact, in this position, the drag of the rotor is a maximum and can put the aircraft in danger by reducing the lift to drag ratio of the aircraft, which makes flight difficult to continue with the remaining engine(s) by generating excessive drag, by creating a risk of over-speed and/or by generating strong asymmetry between the drags of the turbine engines of the aircraft, in the case where only one of them has malfunctioned (which can make the airplane impossible to control).

One of the constraints of the blade setting control systems is therefore to bring these into a position called "feathered" in the case of a failure of the pitch change mechanism of the blade. The feathered position corresponds to a setting greater than that of maximum pitch, forming an angle of approximately 90° with the plane of rotation of the blades. In this position, the chord of the blades is substantially aligned with the wind direction, thus reducing the drag that they generate and, consequently, the yaw imbalance produced on the aircraft. This feathered position also allows a reduction of the residual rotation speed of the blades.

In order to avoid the blades entering the "flat pitch" position in flight, the blades are generally put into the feathered position in the event of a failure of the pitch change mechanism.

To this end, it has been proposed to use a system of eccentric high-density counterweights (approximately 19 tons per cubic meter), subjected to the centrifugal force, of which the inertia, much greater than that of the blades, ensure the return of the latter to the feathered position when the pitch change mechanism has failed. Ten or twelve in number, distributed angularly, these counterweights can total, for themselves alone, 150 to 200 kg. It is possible to refer to document FR2957329 in the name of the Applicant for more details on this type of counterweight system. This solution can, however, be penalizing in terms of mass, because it necessitates the use of heavy counterweights of which the effect is not geared down. Moreover, this system weighs down the turbine engine, which increases its specific fuel consumption.

Also proposed in document WO2012/066240 in the name of the Applicant is to attach balance weights to the conical gears of the pitch control system of the blades to place them overhanging with respect to them. The system is integrated into the spaces situated between the blades for minimum axial and/or radial bulk. In normal operation, the balance weights are held in position by the setting control system. In case of failure of the pitch change mechanism, the action of the centrifugal force due to the rotation of the propeller drives the balance weights toward a rest position which corresponds to the feathered position of the blade. According to the embodiment mentioned in this application, the conical blade root cog leads to a reduction ratio of approximately two between the setting angle of the counterweight and the setting angle of the blade. This solution thus allows a reduction in the mass employed due to gearing down the effects of the balance weights. However, freedom of choice still remains limited due to the constraints connected with the bulk of this system with respect to the available space. These constraints can therefore lead to preventing the integration of the system into the rotor (propeller or fan).

SUMMARY OF THE INVENTION

One objective of the invention is therefore to propose a system for a turbine engine comprising a variable-setting fan capable of avoiding having the blades enter the "flat pitch" position in the event of failure of the pitch change mechanism, for a moderate balance weight compared with the prior art, which has low axial and radial bulk and which can also be adapted to a turbine engine having a high bypass ratio.

For this purpose, the invention proposes a ducted fan of a turbine engine, said fan being housed in a casing and comprising:
 a disc provided with blades on its periphery, said blades being mounted to pivot on the disc around a pivoting axis, and
 a collective pitch change mechanism of said blades, said mechanism being configured to adjust the angular position of the blades around their pivoting axis depending on the flight phases, said angular position being comprised in an angular setting range, said fan being characterized in that it includes blocking means adapted to limit the setting range of the blades to an angular setting range less than or equal to 20°.

In one variant embodiment, the pitch change mechanism 8 is independent, not collective.

Certain preferred but non-limiting features of the fan described above are the following, taken individually or in combination:
- the setting range comprises the angular position of the blades in the cruise phase,
- the setting range is centered on an angular position of the blades in the cruise phase,
- the angular setting range of each blade extends between +10° and −10°, with respect to the angular position of the blades in the cruise phase,
- the angular setting range of the blades comprises an angular range extending between −5° and +15°, preferably between 0° and +10°, with respect to a position of the blades in which the root of said blades is aligned with an axis of revolution of the fan, the blocking means include one or more mechanical abutments facing the pressure and suction side walls of the blades;
- the pitch change mechanism includes blocking means adapted to limit the setting range of the blades,
- the fan comprises a hub ratio less than or equal to 0.35, comprised for example between 0.25 and 0.35, preferably comprised between 0.28 and 0.32,
- the pitch change mechanism of the fan is not provided with a feathering system comprising eccentric counterweights and/or balance weights, and/or
- the fan has an outer diameter between eighty inches (203.2 centimeters) and one hundred and ten inches (279.4 centimeters), preferably between eighty inches (203.2 centimeters) and ninety inches (228.6 centimeters).

According to a second aspect, the invention also proposes a turbine engine comprising a ducted fan of the aforementioned type.

Certain preferred but non-limiting features of the turbine engine described above are the following, taken individually or in combination:
- it also comprises a turbine in fluid communication with the fan and a reduction mechanism coupling the turbine and the fan, the reduction mechanism being epicyclic or planetary and having a reduction ratio comprised between 2.5 and 5, and/or
- it has a bypass ratio greater than or equal to 10, preferably comprised between 12 and 18.

According to a third aspect, the invention proposes a turbine engine fan, said fan comprising:
- a disc with an annular shape overall and defining an axis of revolution of the fan, said disc being provided with blades are its periphery, said blades being mounted to pivot on the disc around a pivoting axis and having a center of gravity, and
- a pitch change mechanism for said blades, said mechanism being configured to adjust an angular position of each blade around the pivoting axis, the pitch change mechanism not being provided with a feathering system comprising eccentric counterweights and/or balance weights.

BRIEF DESCRIPTION OF THE DRAWINGS

Other features, aims and advantages of the present invention will appear more clearly upon reading the detailed description that follows, and with reference to the appended drawings given by way of non-limiting example, in which.

DETAILED DESCRIPTION OF ONE EMBODIMENT

Figure 1:
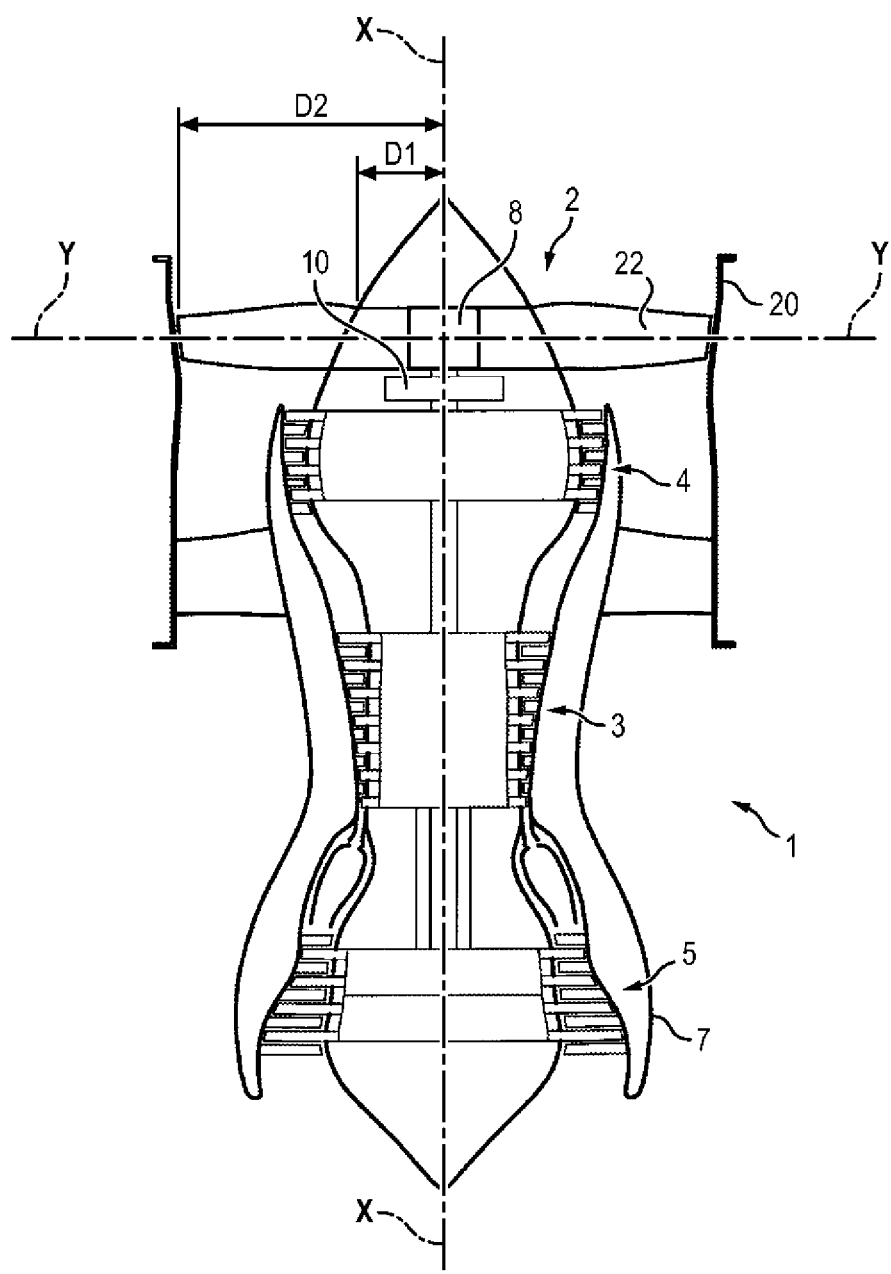
FIG. 1 is a schematic section view of an example of a turbojet comprising a fan conforming to the first embodiment of the invention.

As illustrated in FIG. 1, a turbojet 1 conventionally comprises a fan 2 housed in a fan casing or shroud 20, an annular primary flow space and an annular secondary flow space.

The primary flow space passes through a primary body comprising, from upstream to downstream in the gas flow direction in the turbine engine, one or more compression stages (for example a low-pressure compressor 4 and a high-pressure compressor 3), a combustion chamber, one or more turbine stages 5 (for example a high-pressure turbine and a low-pressure turbine), and an exhaust casing 7. The primary body being conventional, it will not be further detailed here.

The fan 2 comprises a fan disc provided with fan blades 22 at its periphery which, when they are placed rotation drive the flow of air in the primary flow and secondary flow spaces of the turbine engine 1.

The fan disc is driven by the low-pressure shaft, which is centered on the axis X of the turbine engine 1 by a series of bearings and is driven in rotation by the low-pressure turbine 5.

A fan blade 22 conventionally comprises a leading edge which faces the flow of air entering into the fan 2, a trailing edge opposite to the leading edge and pressure side 23 and suction side 24 walls connecting the leading edge and the trailing edge. The blade 22 also comprises a root attached to the fan disc and a tip extending facing the fan casing. The blade 22 is mounted to pivot at its root on the fan disc around a pivoting axis Y, said pivoting axis Y extending radially with respect to the axis X of rotation of the fan 2 (which is congruent with the axis of the turbine engine 1).

The fan 2 also comprises a pitch change mechanism 8 of the fan blades 22.

In a first embodiment, the pitch change mechanism 8 is collective. This mechanism is of the ram type and is configured to drive the fan blades in pivoting around their pivoting axes Y depending on the flight phases of the turbine engine 1. Collective pitch change mechanisms 8 are known to persons skilled in the art.

For one example of this type, it is possible [to refer] to patent application FR 1650041 which proposes a system for controlling the orientation of the blades of a turbine engine fan in which the movable portion of a ram is coupled to pivots of the fan blades so that translation of the movable portion of the ram causes a modification of the orientation of said blades and therefore of their setting.

In a second embodiment, the pitch change mechanism 8 can be individual.

The applicants became aware that, thanks to the presence of the fan casing 20, speed variations upstream of the fan 2 are limited regardless of the flight phase. It is therefore possible to reduce the necessary range Δ of variation for the setting angle of the blades 22 of the fan 2.

In order to avoid the blades 22 setting themselves into the flat pitch position in the event of failure of the pitch change mechanism 8, the range Δ of variation of the setting angle of the blades 22 of the fan 2 is limited to approximately 20°. Thus, whatever position is taken by the blade 22 under the influence of the centrifugal forces, it does not risk generating excess drag for the aircraft.

The range Δ of variation of setting angles of the blades 22 comprises the angular position of the blade 22 in the cruise phase.

In one embodiment, the angular setting range Δ of each blade 22 is centered on an angular position of the blade 22 in the cruise phase. This position has been illustrated by way of an example in FIG. 2: the central position of the blade 22 in this figure corresponds in fact to an example of an angular position of a fan blade in the cruise phase. The positions on either side of the central position can, for their part, illustrate the maximum positions which can be adopted by a blade according to the invention. For example, the possible variation of the setting angle of the blades 22 can be comprised between +10° and −10° with respect to the position of the blade 22 when the airplane is in the cruise phase.

In order to avoid that the blade 22 reaches a position in which the air passing into the fan 2 is no longer compressed, the angular setting range Δ can also be defined to extend between −5° and +15°, preferably between 0° and +10°, with respect to a position of the blade 22 in which its root is aligned with an axis X of the fan 2 (in other words, the general direction of extension of the blade 22 at the root of said blade 22 is substantially parallel to the axis X, when the blade 22 forms an angle of 0° in the setting range Δ).

The blades 22 of the fan 2 can therefore no longer be placed in a flat pitch position, the angle corresponding to this position being outside the range Δ of possible variation.

This embodiment thus allows eliminating the feathering system of the eccentric counterweight or balance weight type, and therefore strongly reducing the weight of the pitch change mechanism 8 in that, in the event of failure of the pitch change mechanism 8, the blade 22 can no longer enter the flat pitch position. In fact, the flat pitch position corresponds to an angle of the blade 22 which is now excluded from the angular range Δ of the blade 22.

The gain in radial bulk (that is in a radial direction with respect to the axis X of the fan 2) also allows:
- either reducing the hub ratio (that is the ratio between the distance D1 between the axis X of the fan 2 and the inner limit of the air stream in the fan 2 at the leading edge of the blades 22 divided by the distance D2 between the axis X of the fan 2 and the tip of the blades 22) of the fan 2.
- or, at the same hub ratio, increasing the bypass ratio of the turbine engine 1.

It will of course be understood that it is also possible to combine these two effects by increasing the bypass ratio of the turbine engine 1 while reducing the hub ratio.

Typically, it is thus possible to obtain a fan 2 having a hub ratio less than or equal to 0.35, for example comprised between 0.25 and 0.35, preferably comprised between 0.28 and 0.32, for a bypass ratio greater than 10, preferably comprised between 12 and 18.

In order to reach bypass ratios greater than 10, the fan 2 can also be decoupled from the low pressure turbine 5, thus allowing the independent optimization of their respective rotation speeds. For example, the decoupling can be accomplished using a reducer, such as an epicyclic reduction mechanism 10 (star gear reduction mechanism) or planetary gear reduction mechanism, placed between the upstream end (with respect to the gas flow direction in the turbine engine 1) of the low-pressure shaft and the fan 2. The fan 2 is then driven by the low-pressure shaft through the reduction mechanism 10.

This decoupling thus allows a reduction in the speed of rotation and the pressure ratio of the fan (2) and an increase in the power extracted by the low-pressure turbine 5. The propulsive efficiency of the turbine engine 1 is therefore improved, while its specific fuel consumption is reduced.

In one embodiment, the reduction mechanism 10 comprises an epicyclic reduction mechanism.

The reduction ratio of the reduction mechanism 10 is preferably comprised between 2.5 and 0.5.

The diameter of the fan 2 can be comprised between eighty inches (203.2 centimeters) and one hundred and ten inches (279.4 centimeters, preferably between eighty inches (203.2 centimeters) and ninety inches (228.6 centimeters). It will be understood here that the diameter of the fan is the radial distance between the axis X of revolution of the fan 2 and the tip of the blades 22 of the fan 2.

In order to limit the setting angle of the blades 22 to the range Δ, the fan 2 comprises means 30 for blocking the rotation of the blades 22 around their pivoting axis Y. The blocking means 30 can in particular comprise one or more mechanical abutments, located near each blade 22 or within the pitch change mechanism 8, to limit the angle that the blades 22 can assume.

Figure 2:
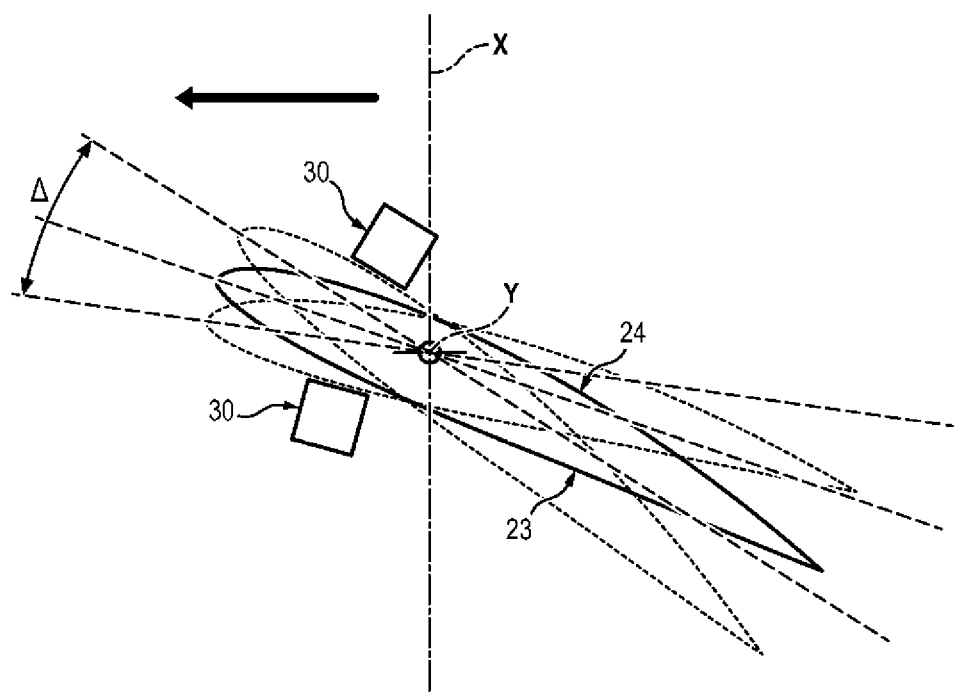
FIG. 2 is a section view of an exemplary embodiment of a fan blade conforming to the invention, on which have been illustrated the position of the blade in the cruise phase as well as its extreme positions, when the blade reaches the lower and upper limits of the setting variation range, and FIG. 3, which has already been described, is a section view of an example of a blade conforming to the prior art.
Figure 3:
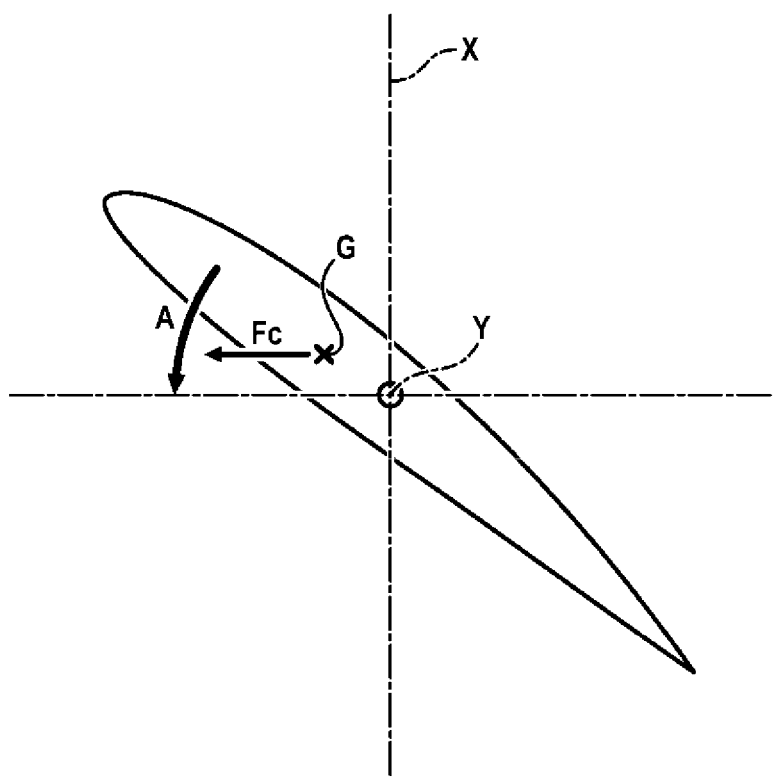

For example, in a first embodiment illustrated in FIG. 2, one or more mechanical abutments 30 can be provided facing the pressure side wall 23 and the suction side wall 24 of each of the blades 22 of the fan 2. These mechanical abutments 30 can be placed at any point along the wall in question at the extreme positions allowed for the blade 22 (for example, +10° and −10° with respect to the position of the blade 22 in the cruise phase). For example, a first abutment can be attached so that it extends a short distance from the leading edge and facing the pressure side wall 23 when the blade 22 forms an angle of −10° with respect to the position of the blade 22 in the cruise phase, while a second abutment can be attached so that it extends a small distance from the leading edge and facing the suction side wall 24 when the blade 22 forms an angle of +10° with respect to the position of the blade 22 in the cruise phase. As a variant, the abutments 30 can extend at the pivoting axis Y of the blade 22, facing the pressure side wall 23 and the suction side wall 24 when the blade 22 assumes the extreme positions described above (and illustrated in FIG. 3).

If necessary, and in particular when the fan 2 is likely to be used in the "reverse" mode (direction of rotation of the blades 22 reversed), the mechanical abutments 30 can be removable to allow unlocked operation.

In a second embodiment, a mechanical abutment 30 can be provided at the pitch change mechanism 8 of the blades 22, for example at the ram or at any other element of the mechanism 8 the travel of which depends on the angular position of the blade 22.

Such a mechanism is for example of the type described in the application FR 1650041 already cited. The mechanism described in this application comprises in particular an annulus gear which is centered on the axis of rotation of the propeller and which includes one or two abutments which cooperate with one or more flats provided on the rods of the movable portion of the ram. These flats allow reduced travel of the ram with respect to the extended ram travel, their end edges coming into abutment on the abutment(s) of the annulus gear to limit the travel of the ram and thus limit the angular setting ranges of the blades of the propeller.

Such a purely mechanical device is reliable, irreversible, simple to implement and involves a considerable mass gain with respect to devices using counterweights.

As described in application FR 1650041, such a system also allows unlocked operation.

The invention claimed is:

1. A ducted fan of a turbine engine, said fan being housed in a casing and comprising:
    a disc provided with blades on its periphery, said blades being mounted to pivot on the disc around a pivoting axis, and
    a collective pitch change mechanism of said blades, said collective pitch change mechanism being configured to adjust the angular position of the blades around their pivoting axis depending on flight phases of the turbine engine, including a cruise phase, said angular position being comprised in an angular setting range,
    wherein said fan comprises blocking means adapted to limit the setting range of the blades to an angular setting range less than or equal to 20°, and
    wherein the blocking means comprise one or more mechanical abutments facing pressure side and suction side walls of the blades.

2. The fan according to claim 1, wherein the setting range of the blades comprises the angular position of the blades in the cruise phase.

3. The fan according to claim 2, wherein the setting range of the blades is centered on an angular position of the blade in the cruise phase.

4. The fan according to claim 2, wherein the angular setting range of the blades extends between +10° and −10°, with respect to the angular position of the blades in the cruise phase.

5. The fan according to claim 1, wherein the angular setting range of the blades extends between −5° and +15° with respect to a position in which the blade roots are aligned with an axis of revolution of the fan.

6. The fan according to claim 5, wherein the angular setting range of the blades extends between 0° and +10° with respect to the position in which the blade roots are aligned with the axis of revolution of the fan.

7. The fan according to claim 1, comprising a hub ratio less than or equal to 0.35.

8. The fan according to claim 7, wherein the hub ratio is between 0.25 and 0.35.

9. The fan according to claim 7, wherein the hub ratio is between 0.28 and 0.32.

10. The fan according to claim 1, wherein the collective pitch change mechanism of the fan is not provided with a feathering system comprising eccentric counterweights and/or balance weights.

11. The fan according to claim 1, having an outer diameter between eighty inches (203.2 centimeters) and one hunched and ten inches (279.4 centimeters).

12. The fan according to claim 11, wherein the outer diameter of the fan is between eighty inches (203.2 centimeters) and ninety inches (228.6 centimeters).

13. The fan according to claim 1, wherein the collective pitch change mechanism comprises the blocking means adapted to limit the setting range of the blades.

14. A turbine engine comprising:
    a ducted fan housed in a fan casing, said fan comprising a disc provided with blades on its periphery, said blades being mounted to pivot on the disc around a pivoting axis and a collective pitch change mechanism of said blades, said mechanism being configured to adjust the angular position of the blades around their pivoting axes depending on flight phases of the turbine engine, including a cruise phase, said angular position being comprised in an angular setting range,
    wherein the turbine engine comprises the fan and comprises blocking means adapted to limit the setting range of the blades to an angular setting range less than or equal to 20°, and
    wherein the blocking means comprise one or more mechanical abutments facing the pressure side and suction side walls of the blades.

15. The turbine engine according to claim 14, further comprising a turbine in fluid communication with the fan and a reduction mechanism coupling the turbine and the fan, the reduction mechanism being epicyclic or planetary and having a reduction ratio comprised between 2.5 and 5.

16. The turbine engine according to claim 14, having a bypass ratio greater than or equal to 10.

17. The turbine engine according to claim 16, wherein the bypass ratio is between 12 and 18.

18. A ducted fan of a turbine engine, said fan being housed in a casing and comprising:
    a disc provided with blades on its periphery, said blades being mounted to pivot on the disc around a pivoting axis, and
    a collective pitch change mechanism of said blades, said collective pitch change mechanism being configured to adjust the angular position of the blades around their pivoting axis depending on flight phases of the turbine engine, including a cruise phase, said angular position being comprised in an angular setting range,
    wherein said fan comprises blocking means adapted to limit the setting range of the blades to an angular setting range less than or equal to 20°, and
    wherein the angular setting range of the blades extends between 0° and +10° with respect to the position in which the blade roots are aligned with the axis of revolution of the fan.

19. The fan according to claim 18, wherein the collective pitch change mechanism comprises the blocking means adapted to limit the setting range of the blades.

20. The fan according to claim 18, wherein the setting range of the blades comprises the angular position of the blades in the cruise phase.

* * * * *

UNITED STATES PATENT AND TRADEMARK OFFICE
CERTIFICATE OF CORRECTION

PATENT NO. : 10,830,066 B2
APPLICATION NO. : 16/068029
DATED : November 10, 2020
INVENTOR(S) : Cuvillier et al.

It is certified that error appears in the above-identified patent and that said Letters Patent is hereby corrected as shown below:

In the Claims

In Column 7, Claim 11, Line 53, delete "hunched" and insert -- hundred --, therefor.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*